United States Patent [19]

Hofmann

[11] 3,942,366

[45] Mar. 9, 1976

[54] FUEL INJECTION ARRANGEMENT

[75] Inventor: Karl Hofmann, Aldingen, Germany

[73] Assignee: Robert Bosch GmbH, Stuttgart, Germany

[22] Filed: Jan. 15, 1974

[21] Appl. No.: 433,454

[30] Foreign Application Priority Data

Feb. 2, 1973 Germany............................ 2305114

[52] U.S. Cl............................... 73/119 A; 200/82 D

[51] Int. Cl.²........................................ G01M 15/00

[58] Field of Search................. 73/119 A, 119, 49.7; 200/82 A, 82 D

[56] References Cited

UNITED STATES PATENTS 2,285,711 6/1942 Hartridge.......................... 73/119 A 2,691,888 10/1954 Daulby.............................. 73/119 A 3,358,499 12/1967 Fourtane........................... 73/119 A

*Primary Examiner*—Richard C. Queisser
*Assistant Examiner*—Marcus S. Rasco
*Attorney, Agent, or Firm*—Edwin E. Greigg

[57] ABSTRACT

A fuel injection nozzle for internal combustion engines is normally closed by an axially movable needle valve. The needle valve is operatively arranged to actuate, at least mediately, an electrical switch after lifting from its valve seat.

4 Claims, 4 Drawing Figures

FUEL INJECTION ARRANGEMENT

BACKGROUND OF THE INVENTION

This invention relates to a fuel injection arrangement for internal combustion engines which includes a fuel injection nozzle normally closed by an axially movable needle valve. The invention relates, more particularly, to such a fuel injection arrangement in which the needle valve is operatively arranged to actuate an electrical switch.

It has become increasingly desirable, after installation on an internal combustion engine, to test the efficiency with respect to poison-free exhaust gases in order to be able to adapt the fuel injection system optimally to a particular engine. The test is conducted with so-called diesel test apparatus by means of which the speed (rpm), the injection point adjustment, the initiation of fuel supply and related operating parameters are all measurable. The sensing units of such test apparatuses can be mounted at very widely different locations of the fuel injection system.

SUMMARY OF THE INVENTION

It is an object of the present invention to provide a fuel injection arrangement for internal combustion engines which serves to sense at least speed (rpm), the injection point adjustment and the initiation of fuel supply.

It is another object of the present invention to provide a fuel injection arrangement which is both inexpensive and technically reliable in determining operating parameters.

It is a further object of the present invention to provide a fuel injection arrangement which avoids the necessity of positioning sensing units at widely different locations of the fuel supply system.

The foregoing objects, as well as others which are to become clear from the following text, are achieved in accordance with the present invention by providing, in a fuel injection arrangement which includes a fuel injection nozzle normally held closed by an axially movable needle valve resting on its seat, an electrical switch actuated, at least mediately, by the lifting of the needle valve from its seat. The electrical switch serves as a needle lift sensor of a test instrument.

According to an advantageous embodiment of the invention, the electrical switch controls a connection between a nozzle holder (ground) and a current source in the test instrument. Furthermore, the electrical switch is installable subsequently into mass-produced conventional injection nozzles.

According to a supplementary embodiment of the invention, the electrical switch includes a probe (sensor) which is connected with the test instrument and extends axially from the end of the injection nozzle facing away from the internal combustion engine into a spring chamber. This test probe is insulated with respect to a nozzle holder and its contact with the needle valve is controlled by the movement of the latter.

According to another embodiment of the invention, the switching function is performed by a yieldable piston disposed in a fuel leakage channel or in a fuel leakage line and loaded by a spring which also functions as a current carrier. The yieldable piston interrupts an electrical circuit between the test instrument and a nozzle holder when the piston is displaced.

DESCRIPTION OF THE PREFERRED EMBODIMENTS

Figure 1:
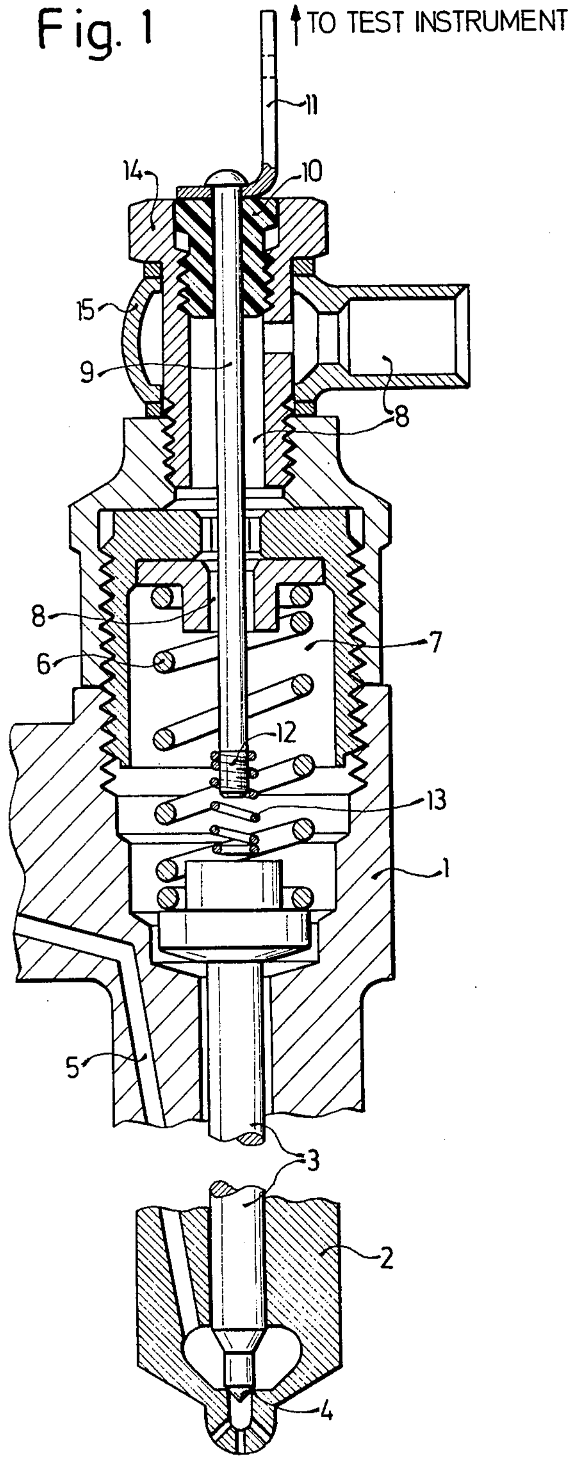
FIG. 1 is a cross-sectional view of a first exemplary embodiment of a fuel injection arrangement according to the present invention in which electrical contact is made by lifting the needle valve.

In the fuel injection nozzle shown only partially in FIG. 1, a needle valve 3 is disposed axially movable in a nozzle holder 1 and a nozzle body 2. The needle valve 3 cooperates with its associated valve seat 4 and is lifted from the seat 4 by the force of fuel streaming through a fuel supply channel 5 in opposition to the force of a valve-closing spring 6. A chamber 7, in which the spring 6 is located, is connected with a leakage fuel line (not shown) through interconnected channels 8. The fuel leakage line leads away fuel that is collected in the spring chamber 7 from leaks between the nozzle body 2 and the needle valve 3. An electrically conductive probe 9 extends into the spring chamber 7, and it is fastened in an apertured, electrically insulating screw 10. The probe 9 is electrically insulated with respect to the nozzle holder 1 and carries a spade (plug-on) electrical connection 11 by means of which an electrical conductor (not shown) leads to a diesel testing instrument (not shown). On the side of the probe 9 facing away from the spade connection 11, a turned-down portion 12 of the probe 9 carries a contact spring 13 which comes into contact with the needle valve 3 as soon as the latter has lifted from its seat 4, i.e., as soon as fuel injection has begun. Contact between the probe 9 and the needle valve 3 is broken when fuel injection ends. During the process of further opening strokes of the needle valve 3, the contact spring 13 is further compressed and thereby maintains, in such condition, an electrical circuit between the diesel test instrument and the nozzle holder 1 because of its elasticity, the circuit including the probe 9, the spring 13, the needle valve 3 and the nozzle body 2. Only when the needle valve 3 has again been pushed onto its seat 4 by the spring 6 is the electrical circuit again interrupted. The testing instrument counts the number of the nozzle openings and therefore the speed (rpm) and it further indicates the beginning and/or the end of each opening stroke and thereby records the injection adjustment and/or the fuel supply onset. The probe 9, the contact spring 13 and the spade connection 11 can be installed in a majority of the mass-produced conventional fuel injection nozzles without any alteration of the precision parts. All that is required is a conventional tensioning screw 14 having an opening at one end and another in its wall, the latter providing communication to an annular tube connection 15 leading to the leakage line via one of the channels 8.

Figure 2:
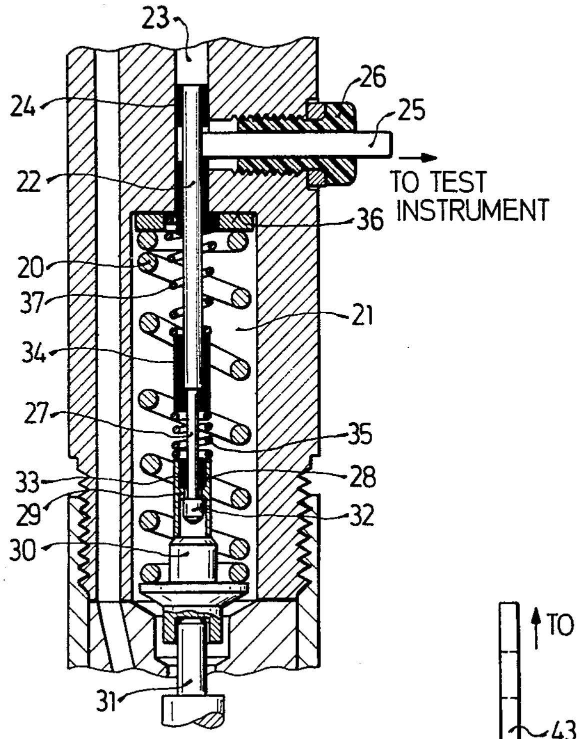
FIG. 2 is a cross-sectional partial view of a second exemplary embodiment of a fuel injection arrangement according to the present invention in which electrical contact is interrupted by lifting the needle valve.
Figure 3:
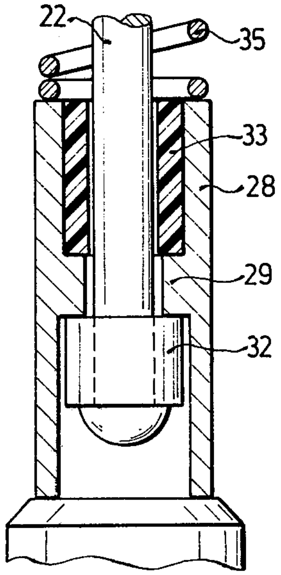
FIG. 3 is an enlarged section of FIG. 2.

FIGS. 2 and 3 show an exemplary embodiment of another fuel injection arrangement direction from that of FIG. 1. As shown in FIG. 2, the second embodiment includes a closing spring 20 which lies further below. The spring 20 is disposed in a spring chamber 21 into which one end of an electrically conductive probe 22 extends. The other end of the probe 22 extends into a leakage fuel line 23. An insulating plastic bushing 24 is pressed into the space between the wall of the leakage fuel line 23 and the probe 22. The bushing 24 has an axial slit (not shown) for the passage of the leakage fuel. The probe 22 is fixed in the leakage fuel line 23 by a transversely disposed conductive rod 25 which serves as a plug-on, electrical connector and by means of a fastening screw 26. The probe 22 has a turned-down portion 27 into which a contact sleeve 28 having a shoulder 29 engages, as best seen in FIG. 3, which shows these parts in enlarged scale. When the injection nozzle is closed, the contact sleeve 28 is in contact, on the one hand, with a spring support disc 30, through which the forces of the spring 20 are transmitted to a needle valve 31, and, on the other hand, with an end 32 of the probe 22 as limited by the shoulder 29. Radially between the contact sleeve 28 and the turned-down portion 27 of the probe 22, an insulating bushing 33 of synthetic material is disposed. An insulating sleeve 34 having a stepwise bore is supported on the end face formed by the turned-down portion 27 of the probe 22 facing away from its end 32. A contact spring 35 is disposed between the insulating sleeve 34 and the contact sleeve 28. The purpose of the contact spring 35 is to ensure that the contact sleeve 28 maintains a contact with the spring disc 30 and, therefore, always maintains contact with the nozzle holder or with electrical ground. A play equalization spring 37, having a lesser pretension than that of contact spring 35, is disposed between the insulating sleeve 34, axially slidable on the probe 22, and an upper face 36 of the spring chamber 21. When the entire switching system is installed, i.e. the probe, the springs and the sleeves, the fastening screw 26 is tensioned only after, with a closed injection nozzle, the quiescent position for the switching system has occurred because of the action of a play equalization spring 37, i.e. the contact sleeve 28 must touch the spring disc 30, and, furthermore, the shoulder 29 of the contact sleeve 28 must touch the end 32 of the probe 22. After that, as soon as the needle valve 31 is lifted from its seat (not shown), the contact sleeve 28 is moved in opposition to the force of the contact spring 35 and the end 32 of the probe 22 is separated from the shoulder 29 of the contact sleeve 28 and, in this way, the electrical connection between the nozzle holder (ground) and the test instrument is interrupted.

Figure 4:
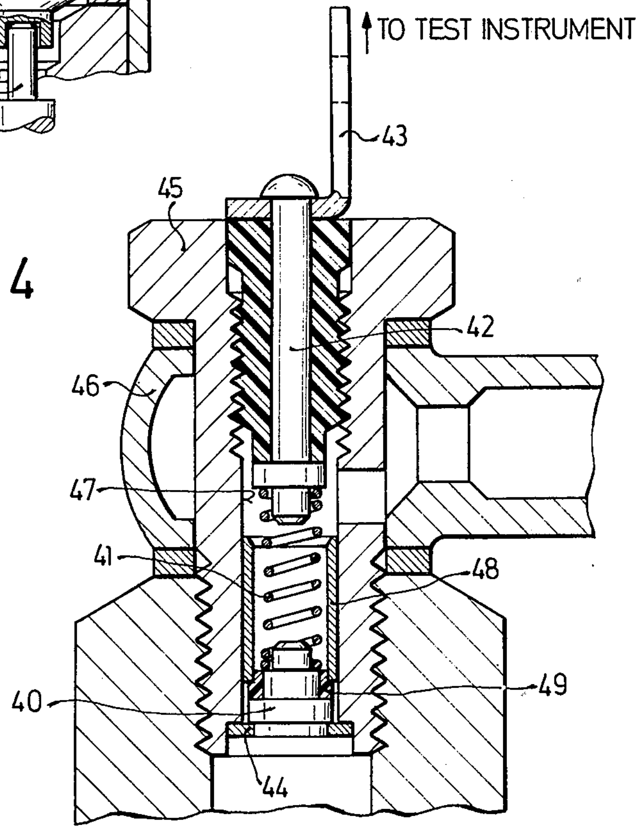
FIG. 4 is a cross-sectional view of a third exemplary embodiment of a fuel injection arrangement according to the present invention in which fuel displaced by the needle valve interrupts electrical contact.

FIG. 4 shows the connection of a fuel injection nozzle from the side of the leakage line, the switching system having been installed in the nozzle. In this third exemplary embodiment, the fuel displaced from a spring chamber (not shown) during the opening stroke of a needle valve is used to displace a yielding piston 40 in opposition to force of a return spring 41 positioned in a spring chamber, where the return spring 41 is in electrically conductive contact with a bolt 42 to which a spade connector 43 of the conductor leading to a test instrument is fastened. In its quiescent position, the yielding piston 40 touches an electrically conductive plate 44 which is connected within a fastening screw 45 which also holds a hollow semi-spherical member 46. A bushing 48 is disposed between the yielding piston 40 and the bore 47 of the fastening screw 45 and it is guided within that bore permitting a predetermined amount of fuel leakage. The bushing 48 is insulated electrically, with respect to the yielding piston 40, by a plastic member 49. As soon as the needle valve lifts from its seat, the fuel displaced from the spring chamber acts to separate the yielding piston 40 from the conductive plate 44 and thus interrupts the connection from the test instrument to the nozzle holder (ground).

It is to be understood that the foregoing description of the illustrative embodiments has been given by way of example, not of limitation. Numerous variants and other embodiments are encompassed within the spirit and scope as defined in the appended claims.

That which is claimed is:

1. In a fuel injection arrangement for internal combustion engines which includes a fuel injection nozzle normally closed by an axially movable needle valve resting on its seat, the improvement comprising electrical switch means serving as a sensor for a test instrument, a nozzle holder, insulating means, a spring chamber into which one end of the needle valve extends, and a spring mounted within the spring chamber and engageable with the needle valve for controlling the movement of the needle valve during its opening and closing strokes, and wherein said switch means includes a probe and a contact spring, said probe being electrically connected at one end to the test instrument and at its other end to the contact spring which is mounted thereon, said probe extending axially from an end of said nozzle facing away from the internal combustion engine and into said spring chamber so that it and the contact spring are substantially coaxial with said spring, said insulating means being positioned between said probe and said nozzle holder at that end of said probe which is connected to the test instrument, and contact of said probe with said needle valve being controlled by movement of the latter, said contact spring coming into contact with the needle valve after opening of said injection nozzle and maintaining this contact yieldingly during the opening and closing strokes of the needle valve.

2. In a fuel injection arrangement for internal combustion engines which includes a fuel injection nozzle normally closed by an axially movable needle valve resting on its seat, the improvement comprising electrical switch means serving as a sensor for a test instrument, coupled to said needle valve and responsive to lifting of said needle valve, a nozzle holder and a fuel leakage channel means, and wherein said switch means includes a yielding piston disposed in said channel means and a spring member loading said piston, said piston when displaced interrupting electrical circuit continuity between said nozzle holder and said test instrument.

3. An arrangement according to claim 2, wherein said spring member is electrically conductive and forms part of a circuit between said nozzle holder and said test instrument.

4. In a fuel injection arrangement for internal combustion engines which includes a fuel injection nozzle normally closed by an axially movable needle valve resting on its seat, the improvement comprising electrical switch means serving as a sensor for a test instrument, a nozzle holder, insulating means, a spring chamber into which one end of the needle valve extends, and a spring mounted within the spring chamber for controlling the movement of the needle valve during its opening and closing strokes, and wherein said switch means includes a probe which is electrically connected at one end to the test instrument, a displaceable sleeve connected to the needle valve and to the other end of said probe, and a contact spring which engages the displaceable sleeve and biases it so that it is connected to the needle valve, said probe extending axially from an end of said nozzle facing away from the internal combustion engine and into said spring chamber so that it, the displaceable sleeve and the contact spring are substantially coaxial with said spring, said insulating means being positioned between said probe and said nozzle holder at that end of said probe which is connected to the test instrument, said displaceable sleeve having a first shoulder and said probe having a second shoulder so that during opening of said nozzle said needle valve displaces said sleeve against the bias of said contact spring effecting disengagement between said first shoulder and said second shoulder thereby interrupting electrical contact between said probe and said sleeve.

* * * * *